US008156723B1

(12) United States Patent
McClure et al.

(10) Patent No.: US 8,156,723 B1
(45) Date of Patent: Apr. 17, 2012

(54) DUAL TINE PATHS FROM DIFFERENT TINE BARS IN A PICKUP

(75) Inventors: John R. McClure, New Holland, PA (US); David M. DeChristopher, Ephrata, PA (US); W. Dale Hotaling, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/091,193

(22) Filed: Apr. 21, 2011

(51) Int. Cl.
*A01D 43/02* (2006.01)
*A01D 89/00* (2006.01)
(52) U.S. Cl. .......................................... 56/364; 56/341
(58) Field of Classification Search ............... 56/364, 56/341, 221, 220, 346, 119; 198/693; 100/189, 100/88, 74
See application file for complete search history.

(56) References Cited

U.S. PATENT DOCUMENTS

| 2,413,072 | A |   | 12/1946 | Sage |
| 3,020,696 | A |   | 2/1962  | Thurow et al. |
| 3,199,604 | A | * | 8/1965  | Lorenzen et al. ............... 171/27 |
| 3,400,526 | A | * | 9/1968  | Tuft ................................. 56/220 |
| 3,511,362 | A | * | 5/1970  | Gaeddert et al. .............. 198/693 |
| 3,512,345 | A |   | 5/1970  | Smith |
| 3,523,412 | A |   | 8/1970  | Dacyszyn |
| 3,543,498 | A |   | 12/1970 | Weichel |
| 3,555,796 | A | * | 1/1971  | Baumeister ....................... 56/221 |
| 3,664,101 | A | * | 5/1972  | Hurlburt ........................... 56/220 |
| 3,722,194 | A |   | 3/1973  | Halls |
| 4,068,454 | A | * | 1/1978  | Webb ............................... 56/220 |
| 4,297,833 | A | * | 11/1981 | Gaeddert ......................... 56/364 |
| 4,464,890 | A |   | 8/1984  | Scholtissek et al. |
| 4,525,991 | A |   | 7/1985  | Naaktgeboren |
| 4,627,226 | A |   | 12/1986 | De Coene |
| 4,928,462 | A |   | 5/1990  | Lippens et al. |
| 6,079,194 | A |   | 6/2000  | Waldrop |
| 6,237,695 | B1 | * | 5/2001  | Pierce et al. ...................... 172/79 |
| 6,327,840 | B1 | * | 12/2001 | Rumph ............................ 56/341 |
| 6,640,527 | B2 | * | 11/2003 | Farley et al. ..................... 56/12.4 |
| 6,948,300 | B1 | * | 9/2005  | Bandstra et al. ................. 56/341 |
| 7,204,074 | B2 | * | 4/2007  | Bandstra et al. ................. 56/341 |
| 7,281,365 | B2 |   | 10/2007 | Zürn et al. |
| 7,296,393 | B1 | * | 11/2007 | McClure et al. ................. 56/341 |
| 7,370,462 | B2 | * | 5/2008  | Kraus et al. ...................... 56/341 |
| 2005/0210855 | A1 | * | 9/2005 | Bandstra et al. ................. 56/341 |
| 2006/0283163 | A1 | * | 12/2006 | Kraus et al. ..................... 56/16.8 |
| 2011/0088365 | A1 | * | 4/2011  | Smith .............................. 56/364 |

FOREIGN PATENT DOCUMENTS

JP 406245624 A 9/1994

* cited by examiner

*Primary Examiner* — Arpad Fabian-Kovacs
(74) *Attorney, Agent, or Firm* — Patrick M. Sheldrake

(57) ABSTRACT

An improved tine reel for a round baler pickup unit that allows tine position to be altered dependant of rotational position of the tine reel and the lateral position of the tine on the pickup. A plurality of tine bars are mounted on the tine reel, with separate tine bars provided for the centrally located tines and the outboard located tines. Separate cams control rotation of the centrally located inboard tine bars and the outwardly located outboard tine bars so that outboard tine position can be optimized without limitation by the inboard tines.

14 Claims, 6 Drawing Sheets

DUAL TINE PATHS FROM DIFFERENT TINE BARS IN A PICKUP

BACKGROUND OF THE INVENTION

The present invention relates generally to a baler for forming cylindrical bales of crop material, commonly referred to as a round baler, and more particularly to an improvement in a crop pickup apparatus for a round baler having lateral converging apparatus working in conjunction with the pickup that is wider than the bale forming chamber inlet.

Round balers rely on a pickup apparatus with a set of tines that engage a windrow of crop material on the ground and lift it upwardly and then urge it rearwardly to a transverse infeed opening into a bale-forming chamber. Pressure to increase efficiency in crop packaging operations has resulted in the prevalence of crop pickup units that are significantly wider than the bale forming chamber into which the crop material is fed. A wider pickup allows the baler to handle wider crop windrows and also results in better crop fill at the lateral extremes of the resultant bale. Historically, wide pickups have incorporated augers situated at the extremes of the pickup width to converge the crop laterally inwardly to achieve a width of the crop mat being fed into the bale chamber that is approximately the same as the chamber width. Longitudinal placement of the converging augers requires an elongated feed table, increasing the distance the crop must travel between the pickup tines and the bale chamber inlet opening. A secondary feed mechanism, such as a stuffer or rotor, is often necessary to convey the converged crop mat along the lengthened feed table and into the bale chamber.

Although quite effective, secondary feed mechanisms add complexity and cost. Without them, the potential for clogging the bale chamber infeed opening increases. Efforts to eliminate the secondary feed mechanism have focused on minimizing the distance between the pickup tines and the crop inlet opening. Reducing the feed table length to eliminate the need for a secondary feed mechanism requires that tine movement on the tine reel be optimized for maximum crop movement efficiency and to reposition tines depending on rotational position to prevent their contacting the more closely positioned converging augers. While this approach reduces the need for a secondary feed mechanism, the benefit may be offset by the increased complexity in the tine position management mechanism within the pickup apparatus.

It would be a great advantage to provide a simple tine position management mechanism for a round baler pickup unit that eliminates the need for a secondary pickup feed mechanism, reduces the required clearance between a tine reel and one or more crop converging augers to overcome the above problems and limitations.

SUMMARY OF THE INVENTION

Accordingly, the present invention, in any of the embodiments described herein, may provide one or more of the following advantages:

It is an object of the present invention to provide a variable position tine reel for a pickup unit on a round baler that extends tines situated ahead of a bale chamber inlet as far as possible toward the bale chamber inlet to enhance crop movement toward the inlet opening.

It is a further object of the present invention to provide a variable position tine reel for a pickup unit on a round baler that retracts the tines forwardly adjacent to outboard converging augers disposed on the pickup unit as far as possible to clear the augers and allow auger diameter to be maximized.

It is a further object of the present invention to provide a variable position tine reel for a pickup unit on a round baler that enables tine extension for laterally central tine positions as well as laterally outboard tine positions to be specifically optimized to improve crop flow at the transition between the crop converging augers and the floor roll situated in the crop inlet opening and reduce the likelihood of plugging.

It is a still further object of the present invention to provide a variable tine position tine reel for a pickup unit on a round baler that enables tine extension for laterally central tine positions to be varied independently from tine extension of the laterally outboard tine positions for improved crop flow at the transition between the crop converging augers and the floor roll situated in the crop inlet opening and reduce the likelihood of plugging.

It is a still further object of the present invention to provide a variable position tine reel for a pickup unit on a round baler that is light in weight to improve the ground-following capabilities of the pickup unit.

It is a still further object of the present invention to provide a variable tine position tine reel for a round baler that is durable in construction, inexpensive of manufacture, carefree of maintenance, easily assembled, and simple and effective to use.

These and other objects are achieved by providing an improved tine reel for a round baler pickup unit that allows tine position to be altered dependant of rotational position of the tine reel and the lateral position of the tine on the pickup. A plurality of tine bars are mounted on the tine reel, with separate tine bars provided for the centrally located tines and the outboard located tines. A linkage connects the centrally located inboard tine bars to the outboard tine bars so that rotation of the outboard tine bars by a tine reel cam and cam follower mechanism is transferred to the inboard tine bar without the need for a second cam or second cam follower mechanism. The linkage configuration is adjusted to provide optimal tine extension position for both the centrally located and the outboard located tines.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
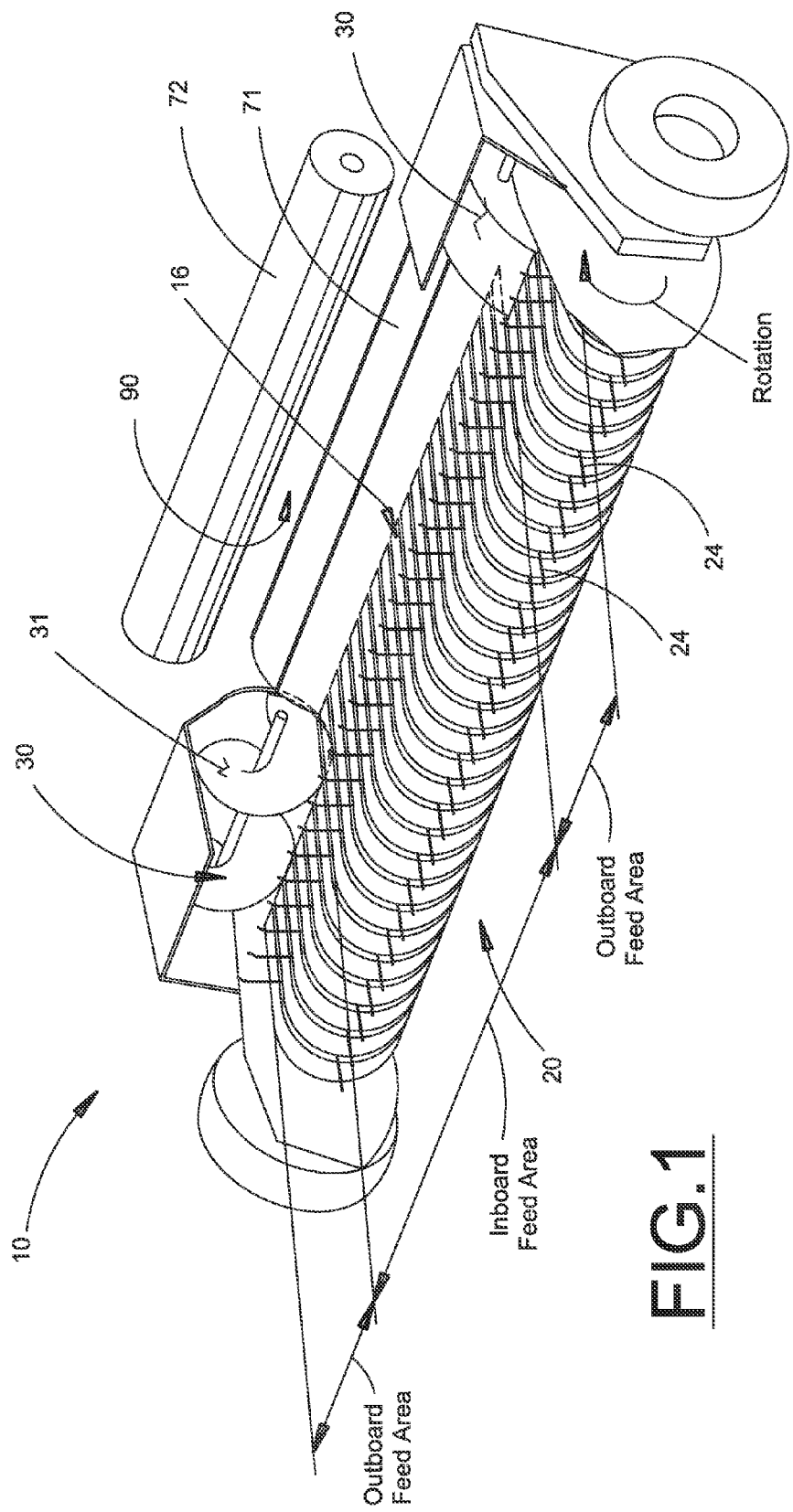
FIG. 1 shows a pickup unit for an agricultural round baler of the type on which the present invention is useful.

FIG. 1 illustrates a conventional crop pickup assembly 10 for a round baler. During field operation, the pickup assembly picks up crop material, such as hay, from the ground and feeds it into a fixed or adjustable chamber on the baler where it is rolled up to form a compact cylindrical package of hay. While still inside the chamber, the formed package is wrapped in its compact form by net, twine, or the like, prior to being ejected as a bale onto the ground for subsequent handling. The operation of pickups and round balers is well-known and is shown by way of example in U.S. Pat. No. 5,044,272, issued on Sep. 3, 1991 to Richard E. Jennings, the entirety of which is incorporated herein by reference.

Figure 2:
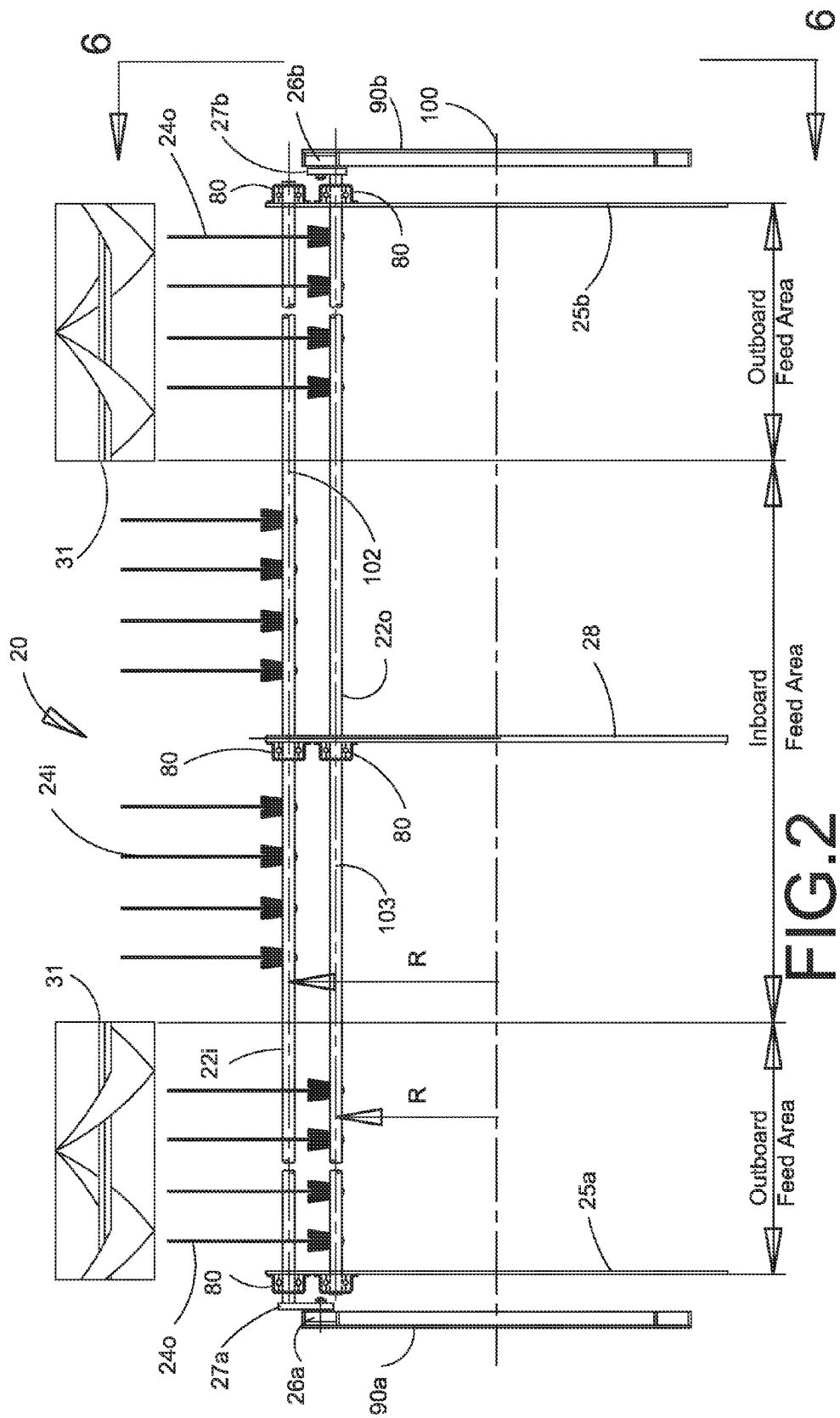
FIG. 2 is a plan view of the tine reel assembly of FIG. 1 showing the relationship of the tine bars and pickup tines to the baler when incorporating one embodiment of the present invention.

In baler applications where the pickup assembly 10 is wider than the inlet opening 90, a crop converging apparatus 30 is typically provided to laterally urge crop from the portions of the pickup assembly outboard of the inlet opening inwardly toward the inlet opening 90 of the bale chamber, shown as the inboard feed area in FIGS. 1 and 2. The converging apparatus 30 urges crop material laterally inwardly to establish a mat of crop material having a width matching that of the inlet opening 90 and desired bale width, typically around four or five feet. In the embodiment shown herein, the converging apparatus 30 comprises a pair of augers 31 arranged on opposing outboard ends of the crop pickup assembly.

Figure 3:
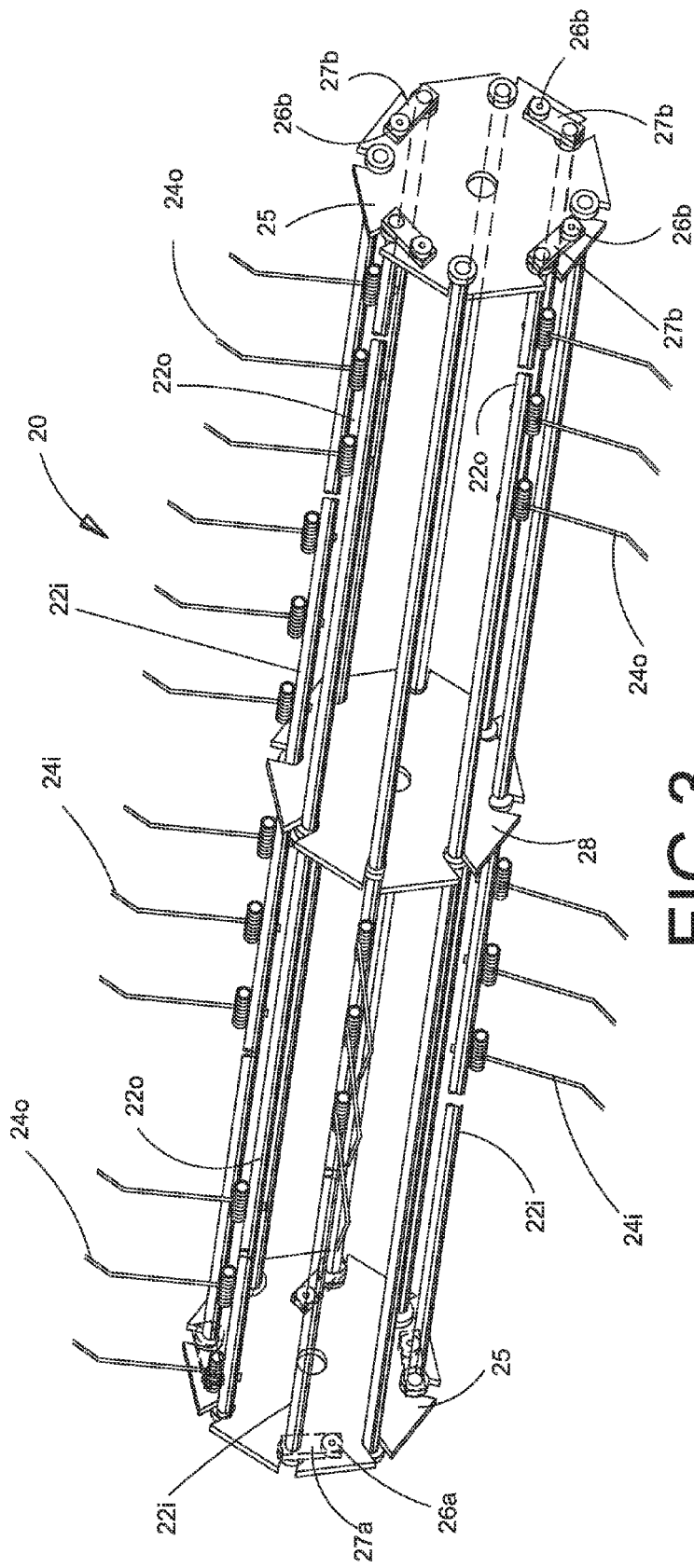
FIG. 3 is a partial perspective view of the tine reel assembly shown in FIG. 2.

Now referring to FIGS. 1 through 3, a first embodiment of the pickup assembly 10 is shown to include a plurality of pick up tines 24 connected to a rotating tine reel 20 which engages and lifts crop material from the ground to an upper surface of the pickup assembly, referred to as the feed table 16, for rearward movement toward the inlet opening 90 to bale chamber, vertically bounded by floor roll 71 and starter roll 72 and laterally bounded by the side walls of the bale forming chamber. The tines 24 are connected to a plurality of tine bars 22, which are in turn connected to the tine reel 20 by a pair of outboard tine spiders 25a, 25b, and one or more inboard tine spiders 28. The elongate tine bars 22 are aligned parallel to tine reel axis 100 and radially spaced-apart therefrom. The tine spiders 25a, 25b, 28 are configured to rotate in unison around tine reel axis 100 in the direction shown when powered by a drive mechanism in the baler thereby causing the tine bars 22 to revolve or orbit about the reel axis 100. As the tine reel 20 revolves, individual tine bars 22 may be rotated to vary the angle at which the tines 24 extend from the tine bars 22. Tine bar rotation is accomplished by the inclusion of one or more cam followers 26a, 26b engaging a first cam 90a or a second cam 90b and connected to the tine bars 22 in a manner to rotate the tine bars 22 as the tine reel 20 revolves in order to alter the angle of the tines 24. Tine positioning is desirable to improve crop pickup from the ground, to accelerate the crop material, and to provide clearance between the tines and closely positioned portions of the baler or pickup assembly.

The tine reel 20 is laterally configured into three adjacent zones: an inboard feed area and two outboard feed areas (see FIGS. 1 and 2). The inboard feed area is located immediately ahead of the floor roll 71. The inboard feed area is laterally bounded on each side by an outboard feed area, each outboard feed area being located immediately ahead of the converging augers 31. Tine reel 20 is configured to produce optimal tine orientation for the inboard feed area and the outboard feed areas, even though optimal movement requires different tine movement and timing. Due to the relative differences in proximity of the tine reel to the floor roll 71 and the converging augers 31, the tips of the inboard tines 24i and the outboard tines 24o must travel slightly different paths. Tine reel 20 thus comprises a plurality of inboard tine bars 22i which are positioned generally parallel to and spaced about the tine reel axis 100. Tine reel 20 further comprises a plurality of outboard tine bars 22o, each angularly displaced relative to a respective inboard tine bar 22i, each also aligned generally parallel to the tine reel axis 100. Each inboard and outboard tine bar 22i, 22o is connected to the spiders 25a, 25b, 28 by one or more bearings 80 which allows the tine bars 22 to rotate about a respective tine bar axis 102, 103. Inboard and outboard tine bars 22i, 22o are displaced from the tine reel axis by a radius R, which may be the same for the inboard tine bars 22i and the outboard tine bars 22o. Alternatively, the outboard and inboard tine bars 22o, 22i may be radially displaced from the tine reel axis at different distances to further improve outboard tine 24o clearance with the converging augers 31.

Each inboard tine bar 22i includes a cam link 27a and a cam follower 28a connected at one end and configured to engage an inboard cam 90a in a manner to control rotational movement of the tine bar 22i as the tine reel 20 revolves around the tine reel axis 100. Rotation of the inboard tine bars 22i allows the angular extension of the inboard tines 24i to be altered as the tine reel revolves. The profile of inboard cam 90a is configured to produce optimal inboard tine 24i movement at all positions of the tine reel revolution for effectively conveying crop material from the pickup to the bale chamber inlet. The use of a unique cam profile for the inboard tines 24i enables optimal tine movement without limitations or compromises required when a single cam profile is used to control both inboard and outboard tines. Inboard tine bars 22i may extend the entire transverse width of the tine reel 20 or they may be shortened to span from an outboard end of the tine reel at which the inboard cam 90a is located to a position spanning at least the inboard feed area.

Similarly, each outboard tine bar 22o includes a cam link 27b and a cam follower 28b connected at one end and configured to engage an outboard cam 90b in a manner to control rotational movement of the outboard tine bar 22o as the tine reel 20 revolves around the tine reel axis 100. Rotation of the outboard tine bars 22o allows the angular extension of the outboard tines 24o to be altered as the tine reel revolves. The profile of outboard cam 90b is configured to produce optimal outboard tine movement at all positions of the tine reel revolution for effectively conveying crop material from the pickup to the bale chamber inlet while preventing contact between the outboard tine and the converging augers 31. Outboard tine bars 22o preferably extend the entire transverse width of the tine reel 20 in tine reels having two outboard feed areas, one at each end of the tine reel. Outboard tines 24o are only connected to the outboard tine bars 22o in the portions of the tine reel width immediately adjacent to the converging augers 31.

Figure 4:
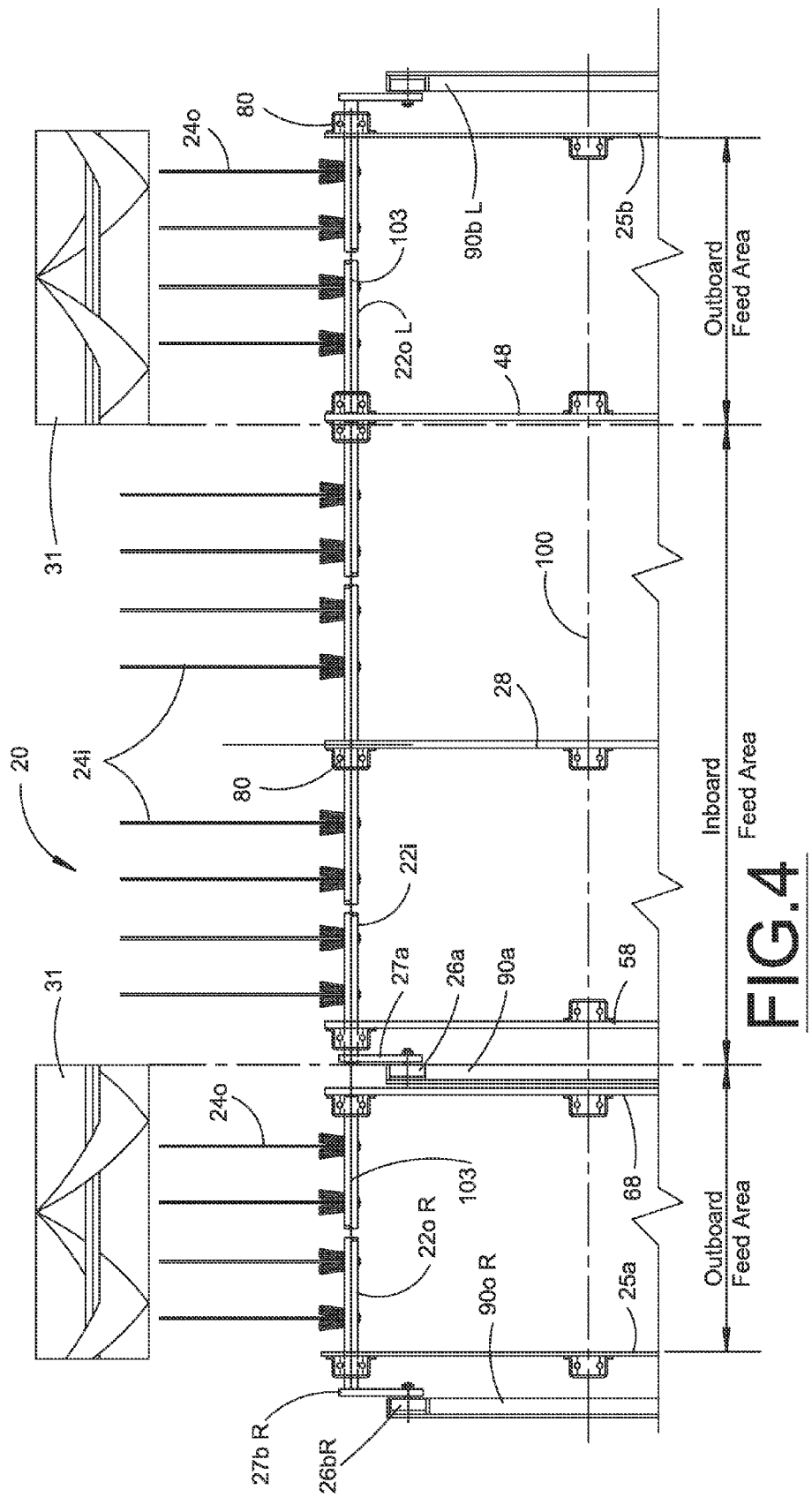
FIG. 4 is a plan view of the tine reel assembly shown in FIG. 1 showing the relationship of the tine bars and pickup tines to the baler when incorporating a second embodiment of the present invention.
Figure 5:
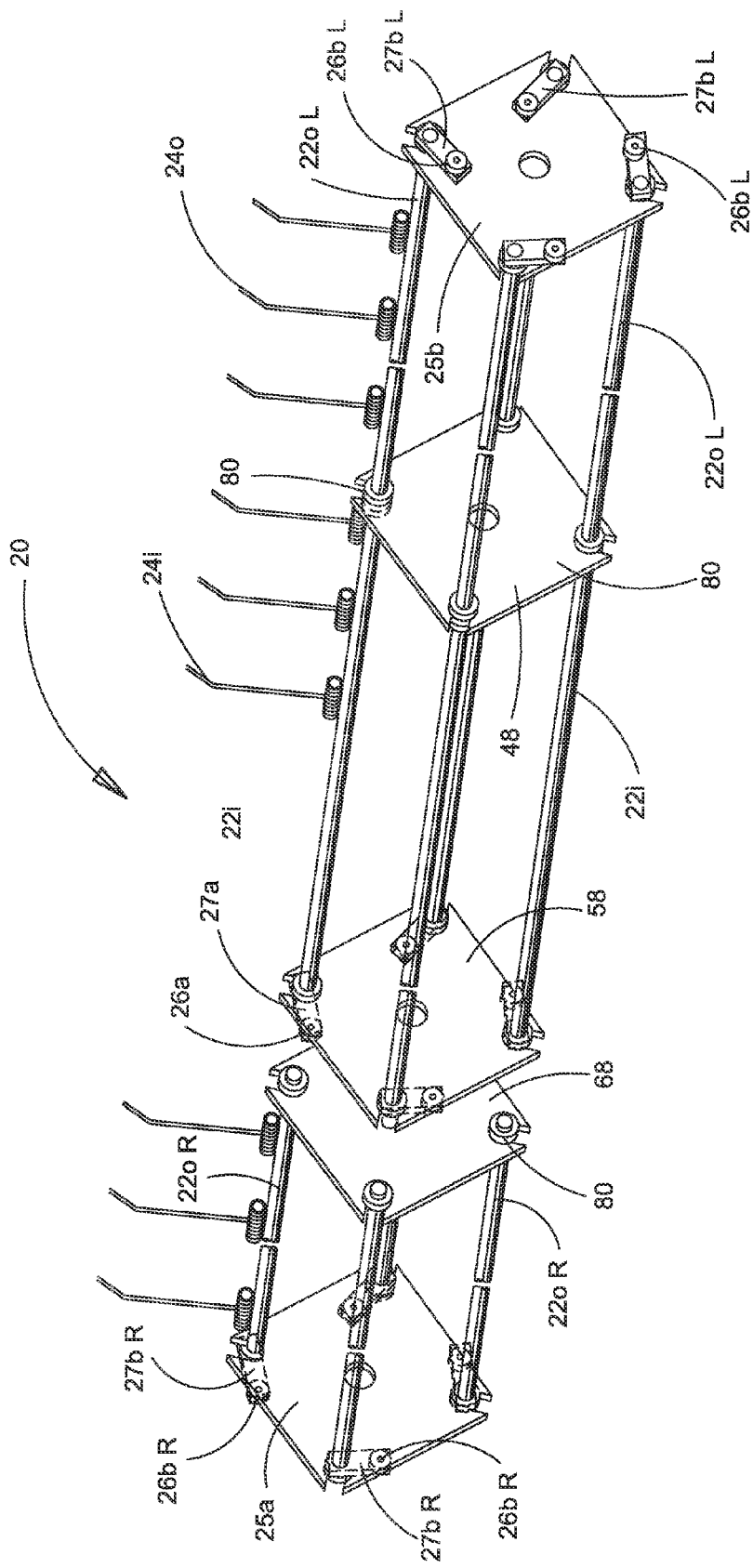
FIG. 5 is a partial perspective view of the tine reel assembly shown in FIG. 4.

A second embodiment is shown in FIGS. 4 and 5, wherein the inboard tine bars 22i and outboard tine bars 22o are shortened so that they do not extend the entire transverse width of the tine reel 20. The tine reel thus comprises opposing end spiders 25a, 25b, first, second, and third intermediate spiders 48, 58, 68, respectively configured to rotate in unison around tine reel axis 100. Right outboard tine bars 22oR and left outboard tine bars 22oL are rotatably mounted to respective spiders, each including one end spider 25, connected by bearings 80. As presented the right end outboard tine bars 22oR are connected to end spider 25a and third intermediate spider 68. The left end outboard tine bars 22oL are connected to end spider 25b and first intermediate spider 48. Though not shown, additional spiders 28 may be positioned between the end spiders and the respective intermediate spiders to increase reel stability.

Each outboard tine bar is provided with a cam link 27bR, 27bL and a cam follower 26bR, 26bL connected at the outboard end of the tine bar adjacent to the respective end spider. The cam followers 26bR, 26bL engage respective outboard cams 90bR, 90bL in a manner to control rotational movement of the right and left end outboard tine bars 22oR, 22oL as the tine reel 20 revolves around the tine reel axis 100 to control the angular extension of the outboard tines 24o. The inclusion of individual cams 90bR, 90bL for outboard tine bars on each end of the tine reel allows the portion of the tine bar spanning between the outboard ends to be eliminated, reducing overall tine reel weight. The cam profiles for the outboard cams 90bR, 90bL are preferably similar so that outboard tine movement is symmetric between the outboard feed areas of the pickup and optimized for crop conveyance and avoidance of the converging augers 31.

Each inboard tine bar 22i is supported by bearings 80 connected to first intermediate spider 48 and second intermediate spider 58 for revolution with the tine reel assembly 20 about tine reel axis 100. Each inboard tine bar 22i is also provided with a cam link 27a and a cam follower 26a connected at one end of the inboard tine bar 22i. The cam followers 26a engage inboard cam 90a to control rotational position of the inboard tine bars 22i as the tine reel revolves. In the second embodiment, inboard cam 90a is disposed between the tine reel ends at a position adjacent to one of the inboard/outboard feed area transitions. The profile of inboard cam 90a is optimized for inboard tine movement without regard to the outboard tine movement limitations which thereby enables optimal crop conveyance toward the bale chamber inlet. As with the outboard tine bars, the inboard tine bars 22i need not span the entire transverse width of the tine reel; their length may be limited to the width of the inboard feed area. Limiting the length of the tine bars in the reel offsets the weight of the additional cam and linkages and enables the overall crop pickup weight to be maintained within reasonable limits.

An additional advantage in the second embodiment shown in FIGS. 4 and 5 is that the inboard and outboard tine bars 22i, 22o may be arranged on a common axis (wherein tine bar axes 102 and 103 are the same axis). This arrangement reduces the peripheral space necessary for a complete transverse array of tines compared to angularaly offset inboard and outboard tine bar arrangements and may allow the number of tine bars to be increased. FIG. 5 illustrates a four-bar tine reel; however, due to the space-saving nature of aligning the inboard and outboard tine bars on a common axis, the same tine control apparatus may be expanded to a five- or six-bar tine reel.

Figure 6:
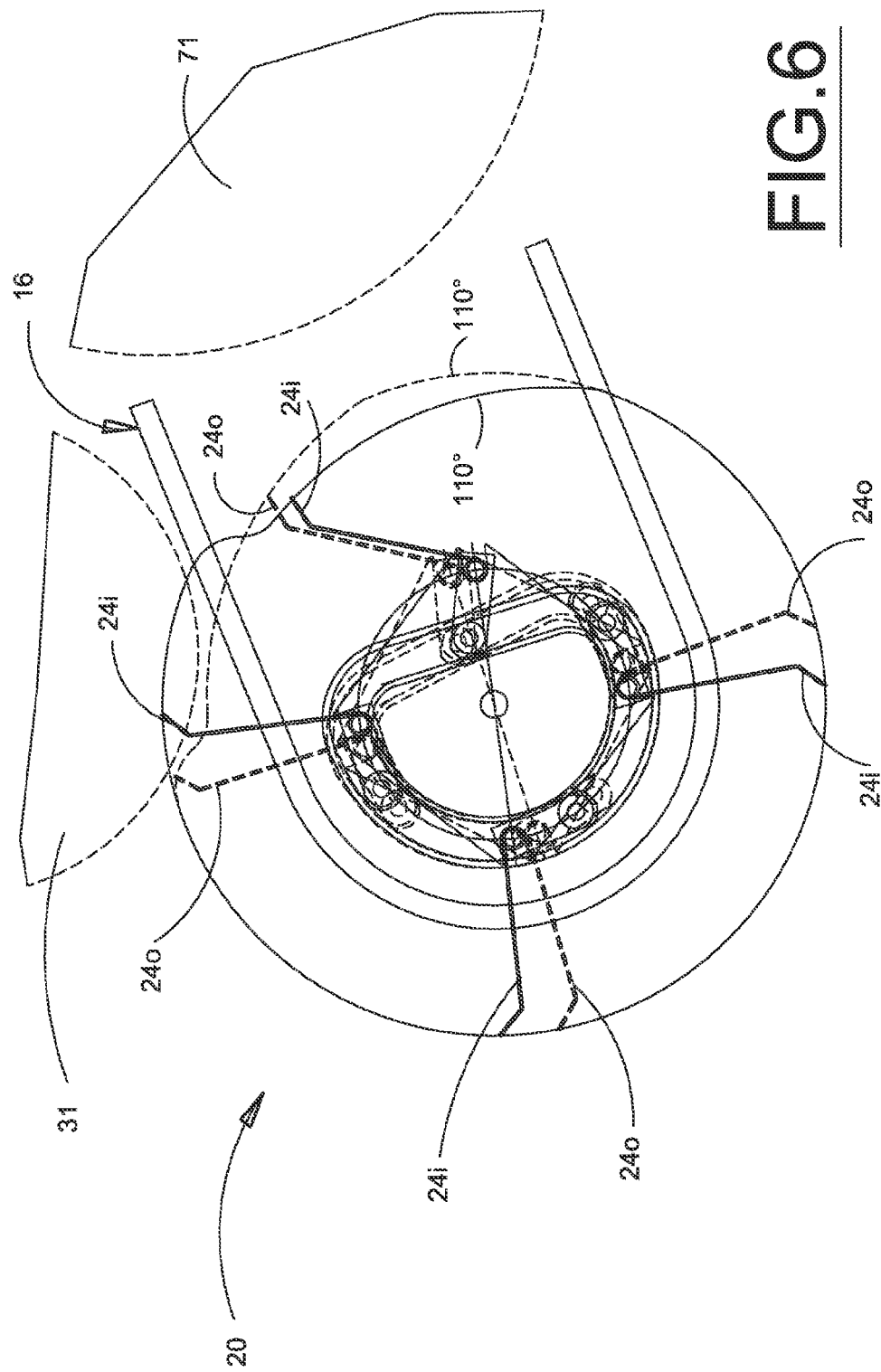
FIG. 6 is a section view of the tine reel assembly of FIG. 2 taken along cut line 6-6.

FIG. 6 illustrates typical variations between inboard tine paths (shown as tine path 110i) and outboard tine paths (shown as tine path 110o). Rather than requiring all tines to have the same general path shape offset rotationally as is required when using a single cam, the figure illustrates the advantages of providing unique cam profiles for the inboard tines and the outboard tines so that the tine paths for each may be individually optimized.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A tine reel for a crop pickup apparatus for a round baler, the baler having a bale chamber inlet configured to receive crop material from the pickup apparatus, the tine reel having generally opposing ends defining a pickup width that is wider than the bale chamber inlet, the pickup apparatus further having a converging apparatus for laterally urging the crop material laterally inwardly toward the bale chamber inlet, said tine reel comprising:

first and second tine bar carriers spaced-apart and configured to revolve about a common reel axis;

a plurality of elongate inboard tine bars connected at each end to respective said first and second tine bar carriers, each of said plurality of inboard tine bars aligned generally parallel to said reel axis and defining, during revolution of said tine bar carriers, a generally cylindrically-shaped periphery, each of said plurality of inboard tine bars connected to said tine bar carriers in a manner allowing rotation about a first tine bar axis;

a plurality of elongate outboard tine bars connected at each end to said respective first and second tine bar carriers, each of said plurality of outboard tine bars aligned generally parallel to said reel axis and said plurality of inboard tine bars, each of said plurality of outboard tine bars carriers connected to said tine bar carriers in a manner allowing rotation about a second tine bar axis;

a first plurality tines connected to and extending from said plurality of inboard tine bars and forwardly disposed from the bale chamber inlet, and a second plurality of tines connected to and extending from said plurality of outboard tine bars and disposed forwardly of the converging apparatus, each tine of said first and second pluralities of tines having a radial extension that is varied by rotational position of said inboard and said outboard tine bars, respectively;

a first cam having a first cam profile configured to manage rotation of said plurality of inboard tine bars as said tine reel revolves about said reel axis, rotation of said plurality of inboard tine bars in a first direction by said first cam extends said first plurality of tines outwardly from said tine reel and rotation of said plurality of inboard tine bars in a second direction opposite from said first direction retracts said first plurality of tines inwardly; and a second cam having a second cam profile configured to manage rotation of said plurality of outboard tine bars as said tine reel revolves about said reel axis rotation of said plurality of outboard tine bars in a first direction by said second cam extends said second plurality of tines outwardly from said tine reel and rotation of said plurality of outboard tine bars in a second direction opposite from said first direction retracts said second plurality of tines inwardly, wherein said first cam profile and said second cam profile are uniquely contoured to manage extension of respective pluralities of inboard and outboard tines.

2. The tine reel of claim 1, wherein each of said plurality of inboard tine bars is non-collinear with any of said plurality of outboard tine bars.

3. The tine reel of claim 2, wherein said first cam and said second cam are disposed on opposing ends of said tine reel.

4. The tine reel of claim 1, further comprising a first plurality of outboard tine bars disposed adjacent to one end of said tine reel and a second plurality of outboard tine bars disposed adjacent to the opposite end of said tine reel, each tine bar of said first and said second pluralities of outboard tine bars being connected to said tine bar carriers in a manner allowing rotation about said second tine bar axis, rotation of said first plurality of outboard tine bars being managed by said second cam profile, said tine reel further having a third cam with a third cam profile configured to manage rotation of said second plurality of outboard tine bars as said tine reel revolves about said reel axis rotation of said second plurality of outboard tine bars in a first direction by said third cam extends said second plurality of tines outwardly from said tine reel and rotation of said second plurality of outboard tine bars in a second direction opposite from said first direction retracts said second plurality of tines inwardly, wherein said second and said third cam profiles manage extension of said plurality of outboard tines.

5. The tine reel of claim 4, wherein said second cam profile and said third cam profile are similarly contoured to manage extension of said plurality of outboard tines, and said first cam profile is uniquely contoured to manage extension of said plurality of inboard tines.

6. The tine reel of claim 5, wherein each of said plurality of inboard tine bars is collinear with a respective tine bar of said first and said second pluralities of outboard tine bars.

7. In a crop pickup apparatus for a round baler, the baler having a bale chamber inlet configured to receive crop material from the pickup apparatus, the pickup apparatus having a forwardly disposed tine reel oriented transverse to the baler configured for lifting crop material from the ground and conveying it rearwardly toward the bale chamber inlet, the tine reel having generally opposing ends defining a width that is wider than the bale chamber inlet, the baler having a converging apparatus for laterally urging the crop material laterally inwardly from said ends of said pickup toward the bale chamber inlet, the improvement in the tine reel comprising:

a plurality of tine bar carriers spaced-apart along a reel axis spanning the tine reel width and configured to revolve about said reel axis;

a plurality of elongate inboard tine bars connected to said plurality of tine bar carriers, each of said plurality of inboard tine bars aligned generally parallel to said reel axis and defining, during revolution of said plurality of tine bar carriers, a generally cylindrically-shaped periphery, each of said plurality of inboard tine bars connected to said plurality of tine bar carriers in a manner allowing rotation about a first tine bar axis;

a plurality of elongate outboard tine bars connected to said plurality of tine bar carriers, each of said plurality of outboard tine bars aligned generally parallel to said reel axis and said plurality of inboard tine bars, each of said plurality of outboard tine bars carriers connected to said plurality of tine bar carriers in a manner allowing rotation about a second tine bar axis;

a first plurality tines connected to and extending from said plurality of inboard tine bars and forwardly disposed from the bale chamber inlet, and a second plurality of tines connected to and extending from said plurality of outboard tine bars and disposed forwardly of the converging apparatus, each tine of said first and second pluralities of tines having a radial extension that is varied by rotational position of said inboard and said outboard tine bars, respectively;

a first cam having a first cam profile configured to manage rotation of said plurality of inboard tine bars as said tine reel revolves about said reel axis, rotation of said plurality of inboard tine bars in a first direction by said first cam extends said first plurality of tines outwardly from said tine reel and rotation of said plurality of inboard tine bars in a second direction opposite from said first direction retracts said first plurality of tines inwardly; and a second cam having a second cam profile configured to manage rotation of said plurality of outboard tine bars as said tine reel revolves about said reel axis rotation of said plurality of outboard tine bars in a first direction by said second cam extends said second plurality of tines outwardly from said tine reel and rotation of said plurality of outboard tine bars in a second direction opposite from said first direction retracts said second plurality of tines inwardly, wherein said first cam profile and said second cam profile are uniquely contoured to manage extension of respective pluralities of inboard and outboard tines.

8. The improvement of claim 7, wherein each of said plurality of inboard tine bars is non-collinear with any of said plurality of outboard tine bars.

9. The improvement of claim 8, wherein said first cam and said second cam are disposed on opposing ends of said tine reel.

10. The improvement of claim 7, further comprising a first plurality of outboard tine bars disposed adjacent to one end of said tine reel and a second plurality of outboard tine bars disposed adjacent to the opposite end of said tine reel, each tine bar of said first and said second pluralities of outboard tine bars being connected to said plurality of tine bar carriers in a manner allowing rotation about said second tine bar axis, rotation of said first plurality of outboard tine bars being managed by said second cam profile, said tine reel further having a third cam with a third cam profile configured to manage rotation of said second plurality of outboard tine bars as said tine reel revolves about said reel axis rotation of said second plurality of outboard tine bars in a first direction by said third cam extends said second plurality of tines outwardly from said tine reel and rotation of said second plurality of outboard tine bars in a second direction opposite from said first direction retracts said second plurality of tines inwardly, wherein said second and said third cam profiles manage extension of said plurality of outboard tines.

11. The tine reel of claim 7, wherein said second cam profile and said third cam profile are similarly contoured to manage extension of said plurality of outboard tines, and said first cam profile is uniquely contoured to manage extension of said plurality of inboard tines.

12. The tine reel of claim 11, wherein each of said plurality of inboard tine bars is collinear with a respective tine bar of said first and said second pluralities of outboard tine bars.

13. A method for managing tine protrusion from a tine reel on a pickup for an agricultural round baler, the baler having a bale chamber inlet configured to receive crop material from the pickup apparatus, the pickup apparatus having a forwardly disposed tine reel transverse to the baler configured for lifting crop material from the ground and conveying it rearwardly toward the bale chamber inlet as the baler is moved across the ground in a forward direction, the pickup apparatus being wider than the bale chamber inlet, the baler having a converging apparatus for laterally urging the crop material inwardly toward the bale chamber inlet, the method comprising the steps of:

provdiing a plurality of transversely spaced-apart tine bar carriers configured to revolve in unison about a reel axis;

providing a plurality of elongate inboard tine bars connected to the tine bar carriers, each of the inboard tine bars aligned generally parallel to the reel axis and defining, during revolution of the tine bar carriers, a generally cylindrically-shaped periphery, each of the inboard tine bars connected to at least two of the tine bar carriers in a manner allowing rotation about a first tine bar axis;

providing a plurality of elongate outboard tine bars connected to the plurality of tine bar carriers, each of the outboard tine bars aligned generally parallel to the reel axis and the inboard tine bars, each of the outboard tine bars carriers connected to at least two of the tine bar carriers in a manner allowing rotation about a second tine bar axis;

providing a first plurality tines connected to and extending from the inboard tine bars and forwardly disposed from the bale chamber inlet, and a second plurality of tines connected to and extending from the outboard tine bars and disposed forwardly of the converging apparatus, each tine of the first and second pluralities of tines having a radial extension that is varied by rotational position of the inboard and the outboard tine bars, respectively;

providing a first cam having a first cam profile configured to manage rotation of the plurality of inboard tine bars as the tine reel revolves about the reel axis, rotation of the inboard tine bars in a first direction by the first cam extending the first plurality of tines outwardly from the tine reel and rotation of the inboard tine bars in a second direction opposite from the first direction retracting the first plurality of tines inwardly;

providing a second cam having a second cam profile configured to manage rotation of the plurality of outboard tine bars as the tine reel revolves about the reel axis rotation of the outboard tine bars in a first direction by the second cam extends the second plurality of tines outwardly from the tine reel and rotation of the outboard tine bars in a second direction opposite from the first direction retracts the second plurality of tines inwardly;

propelling the baler through a windrow of crop material to be baled;

revolving, by the baler, the tine reel to lift and urge the crop material toward the bale chamber inlet;

rotating, by the first cam, the inboard tine bars in the first direction to extend the first plurality of tines during a first portion of the tine reel revolution;

rotating, by the second cam, the outboard tine bars in the first direction to extend the plurality of tines during the first portion of the tine reel revolution;

rotating, by the first cam, the inboard bars in the second direction to retract the plurality of tines during a second portion of the tine reel revolution; and rotating, by the second cam, the outboard bars in the second direction to retract the second plurality of tines during a third portion of the tine reel revolution, wherein the second portion of the tine reel revolution differs from the third portion of the tine reel revolution thereby causing the outboard second plurality of tines to be retracted at a different position in the tine reel revolution than the first plurality of tines.

14. The method of claim 13, further comprising the steps of:

providing a first plurality of outboard tine bars disposed adjacent to one end of the tine reel and connected to the plurality of tine bar carriers in a manner allowing rotation about the second tine bar axis;

providing a second plurality of outboard tine bars disposed adjacent to the opposite end of the tine reel and connected to the plurality of tine bar carriers in a manner allowing rotation about the second tine bar axis;

configuring the second cam to rotate the first plurality of outboard tine bars dependent upon revolution of the tine reel;

providing a third cam with a third cam profile configured to manage rotation of said second plurality of outboard tine bars as said tine reel revolves about said reel axis;

rotating, by the second cam, the first plurality outboard tine bars and, by the third cam, the second plurality of outboard tine bars in the first direction to extend the second plurality of tines during the first portion of the tine reel revolution; and rotating, by the second cam, the first plurality outboard tine bars and, by the third cam, the second plurality of outboard tine bars in the second direction to retract the second plurality of tines during a third portion of the tine reel revolution.

\* \* \* \* \*